United States Patent
Barnes et al.

(10) Patent No.: US 7,421,678 B2
(45) Date of Patent: *Sep. 2, 2008

(54) ASSIST FEATURE PLACEMENT USING A PROCESS-SENSITIVITY MODEL

(75) Inventors: Levi D. Barnes, Hillsboro, OR (US);
Lawrence S. Melvin, III, Hillsboro, OR (US); Benjamin D. Painter, Hillsboro, OR (US)

(73) Assignee: Synopsys, Inc., Mountain View, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 11/433,595

(22) Filed: May 12, 2006

(65) Prior Publication Data

US 2006/0206854 A1 Sep. 14, 2006

Related U.S. Application Data

(60) Provisional application No. 60/772,713, filed on Feb. 13, 2006.

(51) Int. Cl.
*G06F 17/50* (2006.01)
(52) U.S. Cl. .............................. 716/21; 716/19; 716/20
(58) Field of Classification Search ............. 716/19–21; 430/5, 30; 719/19–21
See application file for complete search history.

(56) References Cited

U.S. PATENT DOCUMENTS 6,189,132 B1 * 2/2001 Heng et al. .................... 716/11

7,315,999 B2 * 1/2008 Melvin et al. ................. 716/20
2007/0168898 A1 * 7/2007 Gupta et al. .................... 716/9

OTHER PUBLICATIONS

Schellenberg et al., Adoption of OPC and the impact on design and layout, Jun. 2001, ACM/IEEE, pp. 89-92.*
Gupta et al., Detailed Placement for Improved Depth of Focus and CD Control, Jan. 2005, ACM/IEEE pp. 343-348.*

* cited by examiner

*Primary Examiner*—Jack Chiang
*Assistant Examiner*—Nghia M Doan
(74) *Attorney, Agent, or Firm*—Park, Vaughan & Fleming, LLP

(57) ABSTRACT

One embodiment of the present invention provides a system that determines an assist feature placement. During operation, the system receives an initial assist feature placement for a layout. Next, the system determines assist feature perturbations using the initial assist feature placement. An assist feature perturbation typically comprises a few simple polygons. The system then determines perturbation values at evaluation points in the layout using the assist feature perturbations and an analytical model. If a process-sensitivity model is used, the perturbation value at an evaluation point is associated with the change in the through-process window at that point in the layout. Next, the system determines a change in the value of an objective function using the perturbation values. The objective function can be indicative of the overall manufacturability of the layout. The system then determines an assist feature placement using the change in the value of the objective function. For example, the system can determine an assist feature placement using an assist feature perturbation which minimizes the objective function value.

18 Claims, 7 Drawing Sheets

ASSIST FEATURE PLACEMENT USING A PROCESS-SENSITIVITY MODEL

RELATED APPLICATION

This application hereby claims priority under 35 U.S.C. §119 to U.S. Provisional Patent Application No. 60/772,713, filed on 13 Feb. 2006, entitled "ASSIST FEATURE GENERATION AND SIZING USING A THROUGH PROCESS MODEL," by inventors Levi D. Barnes, Lawrence S. Melvin III, and Benjamin D. Painter. Further, this application is related to U.S. Pat. No. 7,251,807, entitled, "METHOD AND APPARATUS FOR IDENTIFYING A MANUFACTURING PROBLEM AREA IN A LAYOUT USING A PROCESS-SENSITIVITY MODEL," by inventors Lawrence S. Melvin III and James P. Shiely filed on 24 Feb. 2005. This application is also related to U.S. patent application Ser. No. 11/109,534, entitled, "METHOD AND APPARATUS FOR DETERMINING AN IMPROVED ASSIST FEATURE CONFIGURATION IN A MASK LAYOUT," by inventors Lawrence S. Melvin III and Benjamin D. Painter filed on 19 Apr. 2005.

BACKGROUND

1. Field of the Invention

The present invention is related to semiconductor manufacturing. More specifically, the present invention is related to a method and apparatus for determining an assist feature placement in a layout using a process-sensitivity model.

2. Related Art

The dramatic improvements in semiconductor integration densities in recent years have largely been made possible by corresponding improvements in semiconductor manufacturing technologies.

One such semiconductor manufacturing technology involves placing assist features in a mask layout. Assist features (AFs) can be printing (e.g., super-resolution assist features) or non-printing (e.g., sub-resolution assist features). In either case, assist features are meant to improve the depth of focus of the patterns on the mask layout intended to be printed on the wafer.

Prior art techniques for placing assist features typically use mask rules, which place and cleanup assist features based on combinations of feature width and spacing parameters. Such rule-based approaches can result in missed or sub-optimal placement and/or cleanup of assist features. Further, the complexity of such rules increases rapidly with shrinking features size, thereby requiring more wafer data for calibration and more effort on the part of engineers. Moreover, these rules can be overly restrictive which can prevent designers from being able to achieve the best semiconductor device performance.

Furthermore, prior art techniques are typically directed towards improving manufacturability of 1-D patterns. As a result, these techniques are usually not effective for improving the depth of focus of 2-D patterns. In other words, prior art techniques are usually not directed towards optimizing the assist feature placement for improving depth of focus for 2-D patterns.

Hence, what is needed is a method and apparatus for determining an assist feature placement to improve the depth of focus for a layout, especially in regions with complex 2-D patterns.

SUMMARY

One embodiment of the present invention provides a system that determines an assist feature placement. During operation, the system receives an initial assist feature placement for a layout. Next, the system determines assist feature perturbations using the initial assist feature placement. An assist feature perturbation typically comprises a few simple polygons. The system then determines perturbation values at evaluation points in the layout using the assist feature perturbations and an analytical model. Although evaluation points can be located anywhere in the layout, they are usually located in proximity to potential manufacturing problem areas. For example, an evaluation point may be located on an edge of a polygon which is likely to have manufacturing problems. If a process-sensitivity model is used, the perturbation value at an evaluation point is associated with the change in the through-process window at that point in the layout. The system then determines a change in the value of an objective function using the perturbation values. The objective function can be indicative of the overall manufacturability of the layout. Next, the system determines an assist feature placement using the change in the value of the objective function. For example, the system can determine an assist feature placement using an assist feature perturbation which minimizes the objective function value.

In a variation on this embodiment, the system determines the assist feature perturbations by first determining a mask rule violation in the initial assist feature placement. Next, the system can determine an assist feature perturbation using the mask rule violation. In one embodiment, the system selects an assist feature perturbation which avoids the mask rule violation and which results in an optimal value of the objective function. (A mask rule specifies a condition that an assist feature and/or polygon must meet. For example, a mask rule may specify the minimum distance between any two assist features. This mask rule would be violated if two assist features are placed closer than the minimum distance.)

In a variation on this embodiment, the system determines the perturbation values at the evaluation points by: receiving a first value which was pre-computed by convolving the analytical model with the layout at an evaluation point; determining a second value by convolving the analytical model with an assist feature perturbation at the evaluation point; and determining an perturbation value using the first value and the second value.

In a variation on this embodiment, the objective function, Q, is given by $$Q = \sum_i C(M_i[p(x, y)]),$$

where $p(x, y)$ is a two dimensional function that represents the layout, $i$ is an evaluation point, $M_i[p(x, y)]$ is the value of the convolution of the analytical model with the layout at the evaluation point $i$, and $C$ is a cost function.

In a further variation on this embodiment, the cost function returns a low value when the cost function's input value falls within a desired range, and returns a high value when the cost function's input value falls outside the desired range.

In a variation on this embodiment, the analytical model is a process-sensitivity model which can be used to estimate the through-process window at an evaluation point in the layout.

In a variation on this embodiment, the process-sensitivity model is generated by: receiving an on-target process model that models semiconductor manufacturing processes under a first set of process conditions; receiving an off-target process model that models semiconductor manufacturing processes under a second set of process conditions, which are different from the first set of process conditions; and generating the process-sensitivity model using the on-target process model and the off-target process model.

DETAILED DESCRIPTION

Integrated Circuit Design Flow

Figure 1:
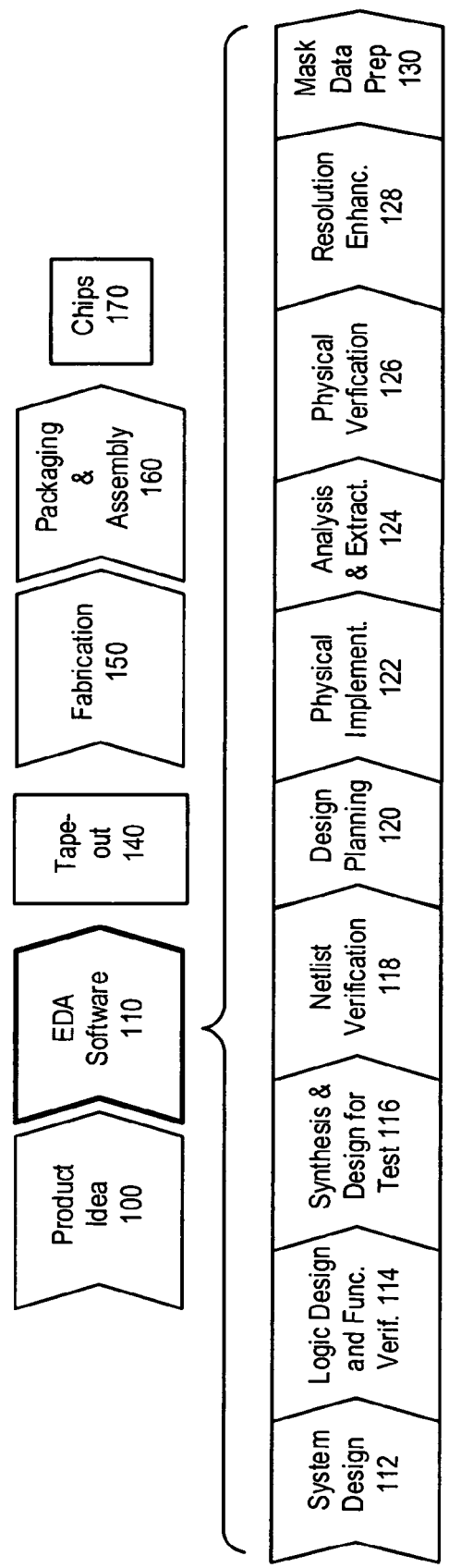
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention.

The process starts with the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. This description is not meant to limit the present invention. For example, an actual integrated circuit design may require the designer to perform the design steps in a different sequence than the sequence described below. The following discussion provides further details of the steps in the design process.

System design (step 112): The designers describe the functionality that they want to implement. They can also perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®g, Magellan, Formality, ESP and LEDA products.

Synthesis and design for test (step 116): Here, the VHDL/Verilog is translated to a netlist. The netlist can be optimized for the target technology. Additionally, tests can be designed and implemented to check the finished chips. Exemplary EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 126): In this step, the design is checked to ensure correctness for manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks to produce finished chips. Exemplary EDA software products from Synopsys, Inc. that can be used at this step include the CATS(R) family of products.

Embodiments of the present invention can be used during one or more of the above described steps. Specifically, one embodiment of the present invention can be used during the resolution enhancement step 128.

Process Variations

Semiconductor manufacturing technologies typically include a number of processes which involve complex physical and chemical interactions. These complex physical and chemical interactions can cause process variations that can cause the characteristics of the actual integrated circuit to be different from the desired characteristics. If this difference is too large, it can lead to manufacturing problems which can reduce the yield and/or reduce the performance of the integrated circuit.

Process variations can arise due to a variety of reasons. For example, in photolithography, variations in the rotation speed of the spindle can cause the resist thickness to vary, which can cause variations in the reflectivity, which, in turn, can cause unwanted changes to the pattern's image. Similarly, bake plates—which are used to drive the solvents out of the wafer and form the pattern in photoresist—can have hot or cold spots, which can cause variations in the critical dimension (CD).

It is helpful to classify process variations into two types: random and systematic. (Note that the term "depth of focus" is often used as a catch all term to describe the amount of random and systematic process variations.) Random process variations are those process variations that are not presently being modeled using an analytical model. On the other hand, systematic process variations are those process variations that are typically modeled using analytical models. For example, spindle speed variation is typically classified as a random process variation, while pattern corner rounding has been compensated for in a systematic manner. Note that, researchers are continually trying to convert random process variations into systematic process variations by creating new analytical models that model random process variations.

Manufacturing Problems

To be economically viable, a semiconductor manufacturing process has to be robust with respect to process variations, i.e., it must be able to tolerate a large enough range of process variations. Note that improving the robustness (for example, by improving the depth of focus) of a process directly results in cost savings. This is because improving depth of focus reduces the amount of time spent on inspection, servicing, and maintenance of the equipment, thereby increasing the number of wafers that are run. Furthermore, improving the depth of focus can increase the yield. Due to these reasons, increasing depth of focus can substantially increase profits.

Moreover, improving depth of focus becomes even more important as a manufacturing process shifts to smaller dimensions because the inherent depth of focus in these processes becomes rapidly smaller. Specifically, at deep submicron dimensions, even a small improvement in the depth of focus can save millions of dollars in manufacturing costs.

Assist Features

Sub-resolution assist features (SRAFs) are an effective way to improve through-process robustness (or depth of focus) of lithographic mask patterns by increasing the use of spatial frequency components that are largely insensitive to variations in focus condition to form the desired feature. Corresponding increases in process margin can increase wafer yield and help to stretch existing technology to smaller process nodes. (Although embodiments of the present invention are described in the context of SRAFs, they can be used with other kinds of assist features, or with shifters in alternating phase shift masks. In the remainder of the instant application, unless otherwise stated, the term "assist feature" refers to an SRAF.)

Embodiments of the present invention can be used during each of five steps in the assist feature placement process, namely, generation of placement rules, initial SRAF placement, resolution of MRC (Mask Rule Check) and other violations, post-placement adjustment of assist features and verification of assist feature effectiveness.

Figure 2:
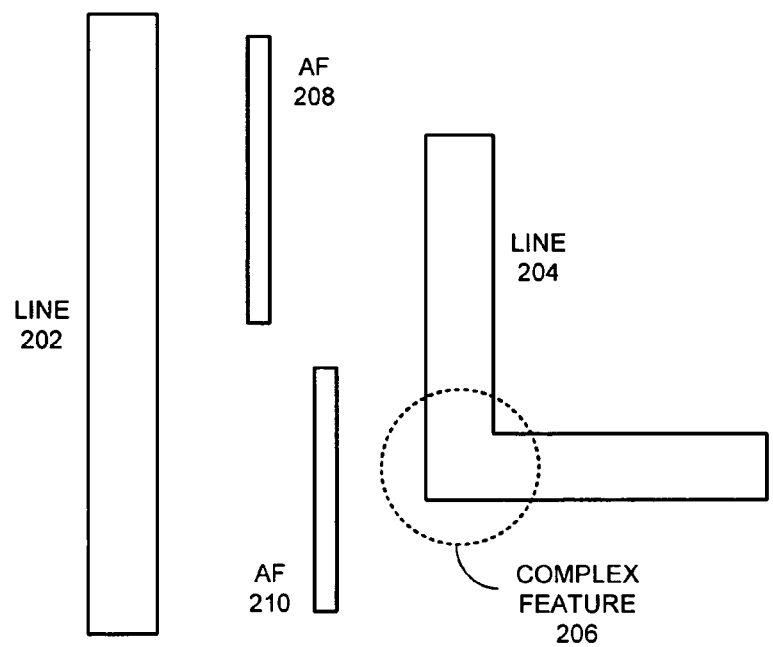
FIG. 2 illustrates assist feature placement in a mask layout in accordance with an embodiment of the present invention.

FIG. 2 illustrates assist feature placement in a mask layout in accordance with an embodiment of the present invention.

Lines 202 and 204 are part of a mask layout. Note that line 204 contains complex feature 206. Assist feature placement and/or dimensioning is more challenging when a layout contains complex features. For example, due to the complex feature 206, we may need to place two assist features 208 and 210 that are staggered, instead of just one assist feature. A layout that has multiple lines with varying pitches is another example of a complex layout.

Prior art techniques for placing assist features typically use mask rules that dictate the assist feature placement and dimensioning based on combinations of feature width and spacing parameters.

Figure 3:
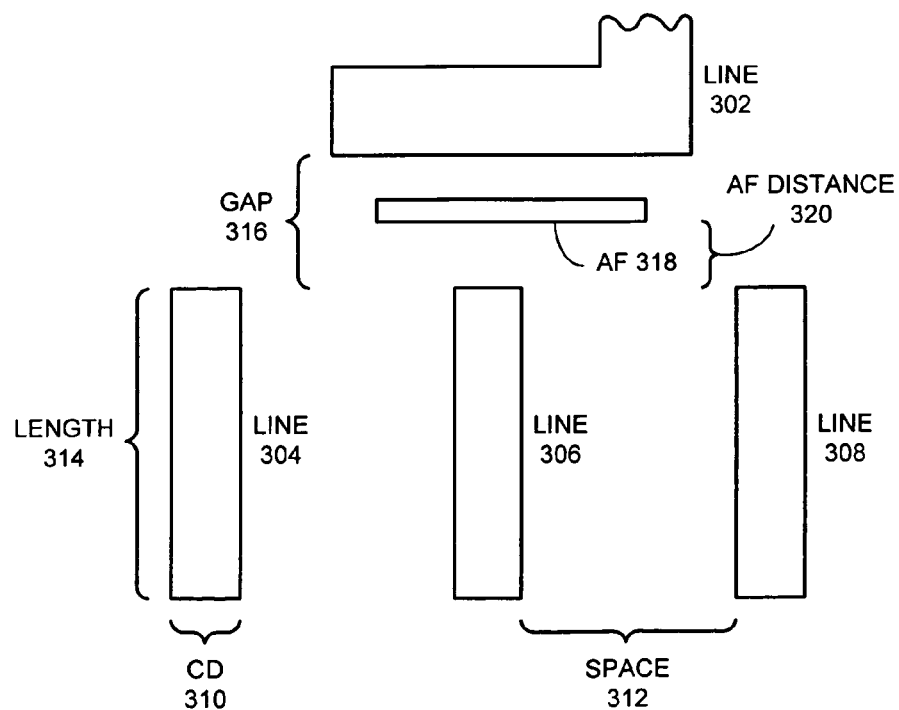
FIG. 3 illustrates assist feature placement using mask rules in accordance with an embodiment of the present invention.

FIG. 3 illustrates assist feature placement using mask rules in accordance with an embodiment of the present invention.

Lines 302, 304, 306, and 308 are part of a mask layout. In a rule-based approach, assist feature (AF) 318 placement/dimensioning can depend on a variety of factors which are organized in the form of a rule table. For example, the AF distance 320 can be a determined based on a rule table that includes a variety of factors, such as, the critical dimension (CD) 310, space 312, length 314, and gap 316.

Figure 4A:
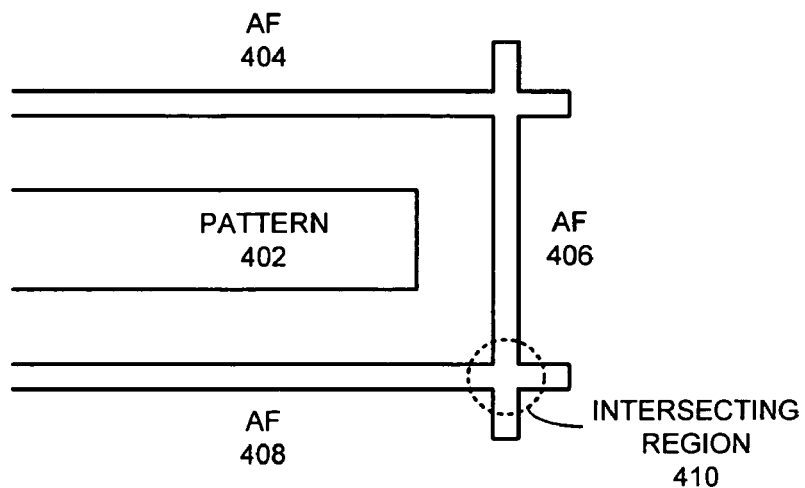
FIG. 4A illustrates how assist features can be placed in a mask layout to improve manufacturability in accordance with an embodiment of the present invention.

FIG. 4A illustrates how assist features can be placed in a mask layout to improve manufacturability in accordance with an embodiment of the present invention.

For example, assist features (AF) 404, 406, and 408 can be placed in a mask layout to improve the manufacturability of pattern 402. Intersecting region 410 may print, which is undesirable. For this reason, rule-based approaches usually cut back assist features to eliminate such intersection regions.

Figure 4B:
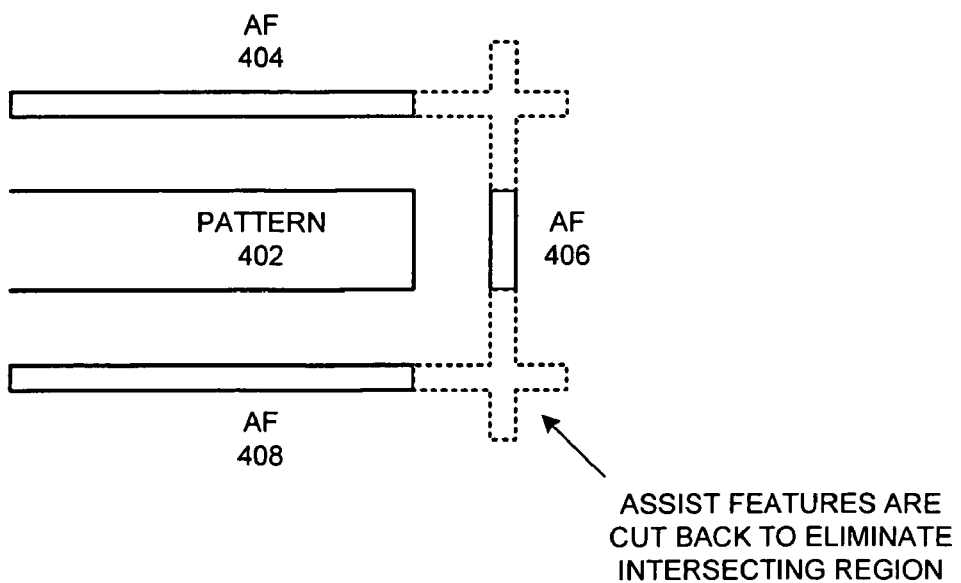
FIG. 4B illustrates how mask rules can be used to cut back assist features to eliminate intersecting regions.

FIG. 4B illustrates how mask rules can be used to cut back assist features to eliminate intersecting regions.

Unfortunately, placing assist features using mask rules can result in missed or sub-optimal placement and/or dimensioning of assist features. Furthermore, for large and complex layouts the rule table can become extremely large and unwieldy.

Process-Sensitivity Model

One of the goals of process modeling is to, in one measurement, get all the process variation information at a point on a mask layout. If this can be achieved, one can reduce process variation by appropriately placing assist features, thereby improving the manufacturability of the mask layout. For example, if a designer knows that a line-end is highly sensitive to process variations and is likely to pull back 40 nm during manufacturing, he can use this information to add or adjust an assist feature to fix the manufacturing problem.

Furthermore, it is very important that one identifies these problem areas without using a substantial amount of computation (time or cycles). Theoretically, problem areas may be identified by simulating various process conditions separately and by comparing the resulting patterns to determine areas that can cause manufacturability problems. Unfortunately, this approach is not practical because it will most likely require an infeasible amount of computational resources for running multiple complex simulation models.

Hence, what is needed is a process-sensitivity model that can quickly tell us whether an assist feature is going to improve the stability of a structure within a workable process window. (Note that determining whether a structure is stable or not depends on the type of the layer. For example, in a metal layer, significant CD variations may be acceptable as long as they do not cause a short or an open in the circuit. In contrast, in a polysilicon layer, even very small CD variations may be unacceptable.)

In one embodiment, the system can compute the process-sensitivity model by first creating an on-target process model that models a semiconductor manufacturing process under nominal process conditions. Note that the semiconductor processing technology can include photolithography, etch, chemical-mechanical polishing (CMP), trench fill, and/or other technologies and combinations of the foregoing.

Next, the system can create one or more off-target process models that model the semiconductor manufacturing process under one or more process conditions that are different from nominal process conditions.

Specifically, an on-target (or off-target) process model can be represented by a multidimensional function. Moreover, an on-target (or off-target) process model can be approximated using a set of basis functions. Furthermore, in one embodiment, creating an on-target process model involves fitting an analytical model to process data for the semiconductor manufacturing process under nominal process conditions. Likewise, creating the one or more off-target process models can involve fitting an analytical model to process data for the semiconductor manufacturing process under process conditions that are different from nominal process conditions. Additionally, in one embodiment, the one or more off-target process models can be created by analytically perturbing the on-target process model.

Figure 5A:
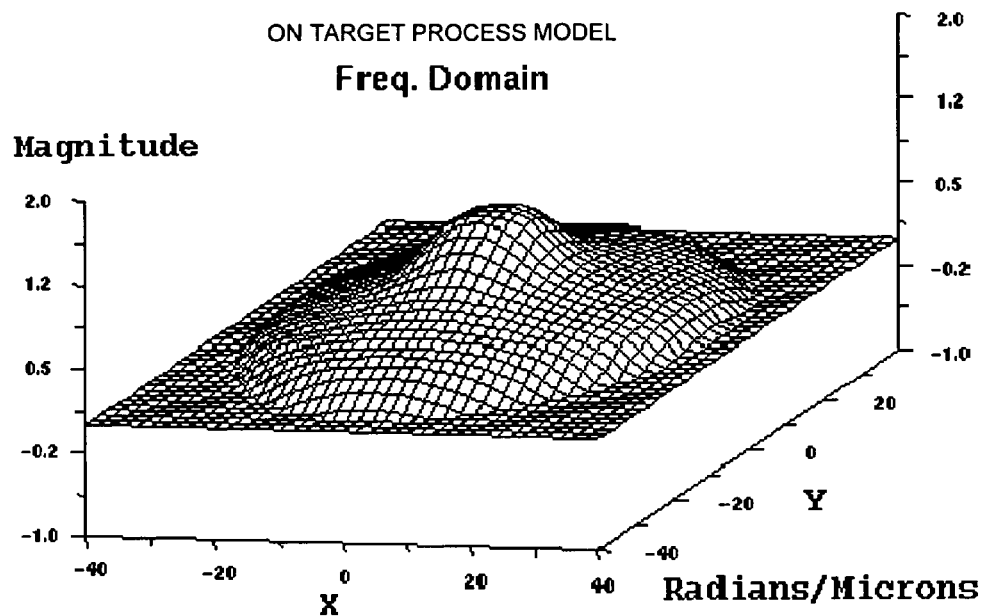
FIG. 5A illustrates a plot of a 2-D function that represents an on-target process model in accordance with an embodiment of the present invention.

FIG. 5A illustrates a plot of a 2-D function that represents an on-target process model in accordance with an embodiment of the present invention.

Figure 5B:
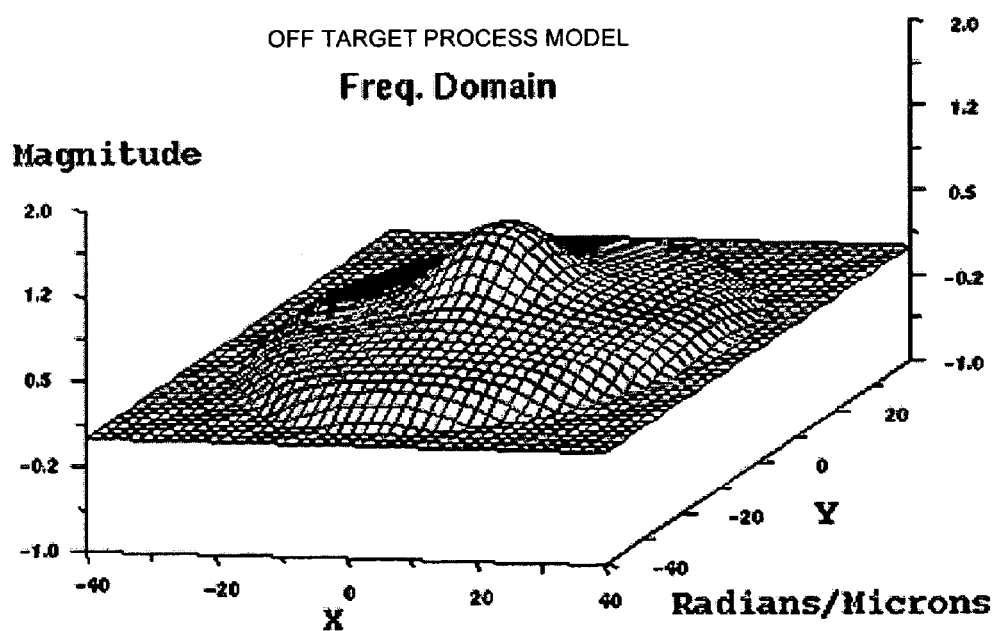
FIG. 5B illustrates a plot of a 2-D function that represents an off-target process model in accordance with an embodiment of the present invention.

FIG. 5B illustrates a plot of a 2-D function that represents an off-target process model in accordance with an embodiment of the present invention.

Figure 5C:
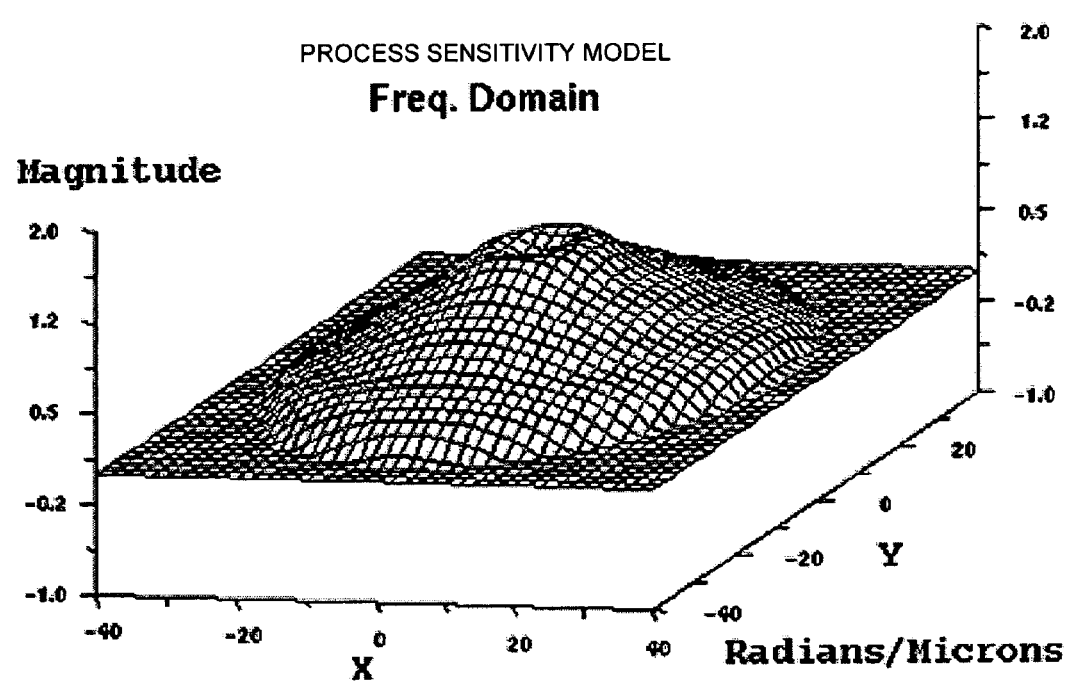
FIG. 5C illustrates a plot of a process-sensitivity model in accordance with an embodiment of the present invention.

FIG. 5C illustrates a plot of a process-sensitivity model in accordance with an embodiment of the present invention.

Note that the 2-D functions illustrated in FIG. 5A and FIG. 5B represent the on-target and the off-target process models, respectively, in the spatial frequency domain. Furthermore, note that, in FIG. 5A, FIG. 5B, and FIG. 5C, the X and Y axes identify a spatial-frequency component (in units of radians per micron), whereas the Z axis indicates the magnitude of a specific spatial-frequency component. These process models can also be represented in other domains, such as the space domain. Additionally, these process models can also be represented in other coordinates, such as polar coordinates.

For example, let us look at how we can create a process-sensitivity model for photolithography. Let $P_t$ represent an on-target process model, i.e., let $P_t$ model the optical lithography process when it is in focus, and let $P_d$ represent an off-target process model, e.g., let $P_d$ model the optical lithography process when it is defocused. Now, the process-sensitivity model, $F_p$, can be computed as follows: $F_p=(P_t-P_d)/\Delta P_d$, where $\Delta P_d$ is the focus offset (in units of length).

In the above example, we only considered a single off-target process model. But, we can have two or more off-target process models. In general, the process-sensitivity model, $F_p$, can be computed as follows:

$$F_p = \frac{1}{n}\left(\frac{1}{\Delta P_1}(P_t - P_1) + \frac{1}{\Delta P_2}(P_t - P_2) + \ldots + \frac{1}{\Delta P_n}(P_t - P_n)\right),$$

where, $P_{1\ldots n}$ are off-target process models that model arbitrary (e.g., non-optimal) process conditions, $P_t$ is the on-target process model that models a nominal (e.g., optimal) process condition, and $\Delta P_{1\ldots n}$ are the respective changes in the process conditions between the nominal process condition and the arbitrary (1 . . . n) process conditions.

For example, let $P_t$ model the optical lithography process when it is in focus. Furthermore, let $P_{dn}$ model the optical lithography process when it is negatively defocused, i.e., the distance between the lens and the wafer is less than the on-target distance. Additionally, let $P_{dp}$ model the optical lithography process when it is positively defocused, i.e., the distance between the lens and the wafer is larger than the on-target distance. Now, the process-sensitivity model, $F_p$, can be computed as follows:

$$F_p = \frac{1}{2}\left(\frac{(P_0 - P_{dn})}{\Delta P_{dn}} + \frac{(P_0 - P_{dp})}{\Delta P_{dp}}\right),$$

where $\Delta P_{dn}$ and $\Delta P_{dp}$ are the negative and positive focus offsets (in units of length).

Note that $(P_t-P_{dn})/\Delta P_{dn}$ and $(P_t-P_{dp})/\Delta P_{dp}$ model the pattern features that are lost during negative and positive defocusing, respectively. In the above example, we compute the process-sensitivity model, $F_p$, by adding $(P_t-P_{dn})/\Delta P_{dn}$ and $(P_t-P_{dp})/\Delta P_{dp}$, and by dividing by 2 to normalize the process-sensitivity model. (Note that the process-sensitivity model can also be used without normalization.)

Determining an Assist Feature Placement

Figure 6:
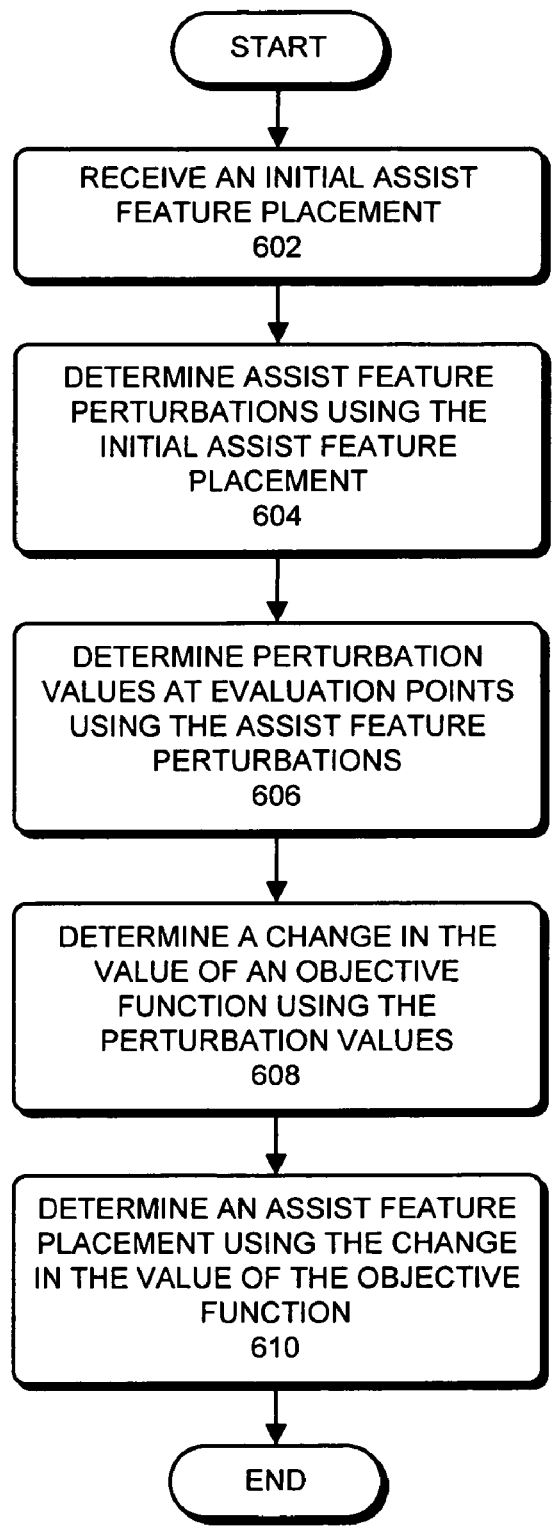
FIG. 6 presents a flowchart that illustrates a process for determining an assist feature placement in accordance with an embodiment of the present invention.

FIG. 6 presents a flowchart that illustrates a process for determining an assist feature placement in accordance with an embodiment of the present invention.

The process typically begins by receiving an initial assist feature placement for a layout (step 602).

The system then determines assist feature perturbations using the initial assist feature placement (step 604).

In one embodiment, the system determines assist feature perturbations by first determining a mask rule violation in the initial assist feature placement. The system then determines an assist feature perturbation using the mask rule violation. Note that a mask rule violation can give rise to multiple assist feature perturbations. In one embodiment, the system selects the assist feature perturbation which avoids the mask rule violation and which results in an optimal value of the objective function.

Figure 7A:
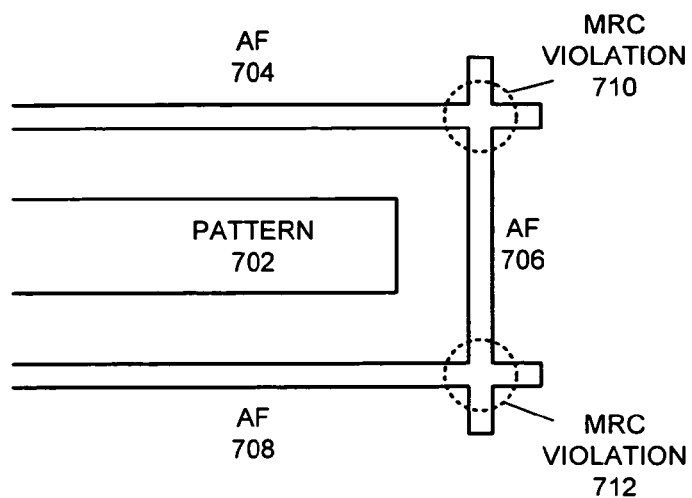
FIGS. 7A, 7B, and 7C illustrate how assist feature perturbations can be determined using a mask rule violation in accordance with an embodiment of the present invention.
Figure 7B:
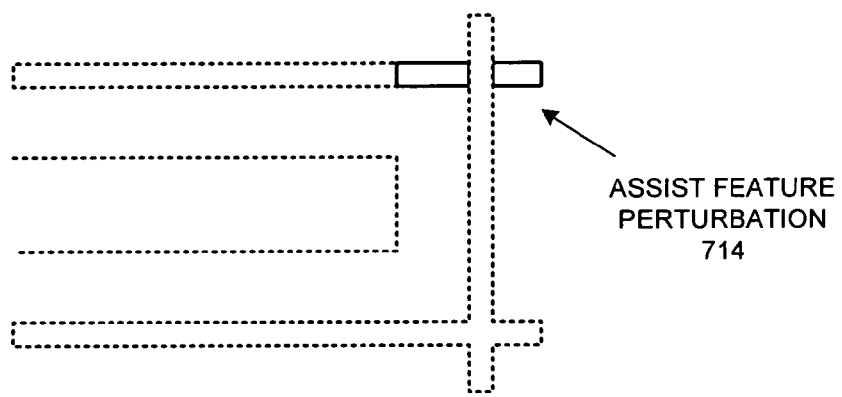
Figure 7C:
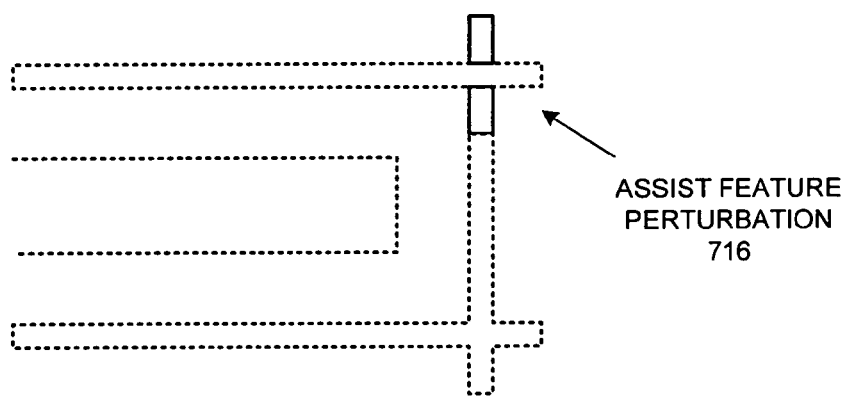

FIGS. 7A, 7B, and 7C illustrate how assist feature perturbations can be determined using a mask rule violation in accordance with an embodiment of the present invention.

Assist features 704, 706, and 708 are placed in proximity to pattern 702 using a set of placement rules. However, this assist feature placement causes MRC violations 710 and 712. The system can determine a number of assist feature perturbations using these MRC violations. For example, the system can generate assist feature perturbation 714 as shown in FIG. 7B based on MRC violation 710. Alternatively, the system can generate assist feature perturbation 716 as shown in FIG. 7C based on MRC violation 710. (Similarly, the system can also generate assist feature perturbations based on MRC violation 712.)

Note that an assist feature perturbation comprises the "changes" or "perturbations" in the assist features, and hence, typically contains only a few simple polygons. For example, the assist feature perturbations (shown using solid lines) in FIGS. 7B and 7C contain only a few simple polygons. Convolving an analytical model with the whole layout usually requires a substantial amount of computation. In contrast, an analytical model can be convolved with a few polygons very quickly. Embodiments of the present invention use this important insight to substantially reduce the amount of computation required to determine an improved assist feature placement.

Next, the system determines perturbation values at evaluation points in the layout using the assist feature perturbations and an analytical model (step 606). Although evaluation points can be located anywhere in the layout, they are usually located in proximity to potential manufacturing problem areas. For example, an evaluation point may be located on an edge of a polygon which is likely to have manufacturing problems.

In one embodiment, the system determines a perturbation value at an evaluation point by first receiving a pre-computed value which was computed by convolving the analytical model with the layout at the evaluation point. Next, the system determines a second value by convolving the analytical model with an assist feature perturbation at the evaluation point. As was noted before, this convolution step can be performed very quickly because assist feature perturbations usually contain substantially fewer polygons than a layout. The system then determines the perturbation value using the pre-computed value and the second value.

The system then determines a change in the value of an objective function using the perturbation values (step 608).

For example, in one embodiment, the objective function, Q, is given by $$Q = \sum_i C(M_i[p(x, y)]),$$

where $p(x, y)$ is a two dimensional function that represents the layout, i is an evaluation point, $M_i[p(x, y)]$ is the value of the convolution of the analytical model with the layout at the evaluation point i, and C is a cost function.

The analytical model value $M_i[p(x, y)]$ at an evaluation point i can be computed using the following expression:

$$M_i[p(x, y)] = \sum_k \left( \int p(x - x_i, y - y_i) \lambda_k(x, y) dx dy \right)^2,$$

where, $p(x, y)$ is a two dimensional function that represents the layout, $x_i$ and $y_i$ are the coordinates of the evaluation point i, and $\lambda_k$ is the $k^{th}$ kernel in the analytical model.

A small change in the pattern (e.g., an assist feature perturbation) causes the model value to change by $\delta M_i$, which can be computed using the following expression:

$$\delta M_i = 2 \sum_k \left( \int \delta p(x - x_i, y - y_i) \lambda_k(x, y) dx dy \right)$$
$$\left( \int p(x - x_i, y - y_i) \lambda_k(x, y) dx dy \right) +$$
$$\sum_k \left( \int \delta p(x - x_i, y - y_i) \lambda_k(x, y) dx dy \right)^2.$$

The perturbation value $\delta M_i$ can be approximated by ignoring the second order term. In other words, the perturbation value can be approximated using the following expression:

$$\delta M_i = 2 \sum_k \left( \int \delta p(x - x_i, y - y_i) \lambda_k(x, y) dx dy \right)$$
$$\left( \int p(x - x_i, y - y_i) \lambda_k(x, y) dx dy \right).$$

In one embodiment, the second factor in each product term in the above summation, i.e., $(\int p(x-x_i, y-y_i) \lambda_k(x, y) dx dy)$, can be pre-computed and stored in a database so that it can be looked up during run time using the location of the evaluation point. The first factor can be quickly computed during operation because it involves a convolution between the analytical model and an assist feature perturbation which typically contains a few simple polygons. Hence, during operation, the system can quickly compute the perturbation value $\delta M_i$ by: receiving the pre-computed second factors; quickly computing the first factors; and summing the product of the first factors with the second factors.

Once the perturbation values ($\delta M_i$) are known for all the evaluation points, we can determine a change in the objective function using the following Taylor series expansion:

$$\delta Q = \sum_i \sum_{n=1}^{\infty} \frac{1}{n!} \frac{d^n C}{d M^n}(M_i) \delta M_i^n.$$

In one embodiment, the system approximates the change in the objective function by only using the first order term in the Taylor series expansion. In other words, the change in the objective function can be approximated using the following expression:

$$\delta Q = \sum_i \frac{dC}{dM}(M_i[p(x, y)]) \delta M_i.$$

The cost function, C, can be any differentiable function. Specifically, in one embodiment, the cost function is a differentiable function that returns a low value when the cost function's input value falls within a desired range, and returns a high value when the cost function's input value fall outside the desired range.

For example, the cost function can be a spliced half-sigmoid, which is a piecewise splice of a sigmoidal (e.g., Fermi-Dirac) distribution and a linear function. Specifically, the cost function can be computed using the following expression:

$$C(x) = \begin{cases} \frac{1}{\exp(-(x-x_{th})/w)+1} & x < x_{th} \\ \frac{1}{2} + \frac{w}{4}(x - x_{th}) & x \geq x_{th} \end{cases},$$

where w and $x_{th}$ are parameters. The first parameter w determines how sharply the function "turns on" at the threshold value $x_{th}$, and it also determines the steepness of the linear continuation beyond $x_{th}$. Note that the cost function has a value of ½ at the threshold $x_{th}$.

Finally, the system determines an assist feature placement using the change in the value of the objective function (step 610).

For example, in one embodiment, the system can select the assist feature perturbation that minimizes $\delta Q$. Given an assist feature perturbation, the system can determine the assist feature placement by applying the assist feature perturbation to the initial assist feature placement. Further, in one embodiment, the system determines an optimal assist feature placement using the change in the value of the objective function.

To summarize, two important aspects of the present invention make it substantially superior to prior art techniques. First, the present invention can quickly assess and improve the manufacturability of an assist feature placement by simultaneously estimating the through-process window at a number of evaluation points in the layout. In contrast, prior art techniques do not use a process model to correct MRC violations (they use rule tables). Further, prior art techniques do not account for the effect of an assist feature correction on multiple evaluation points.

Second, the present invention substantially reduces the amount of computation required to determine the effect of an assist feature perturbation. This is because the present invention separates the computation into two terms. One of the terms involves a convolution of the analytical model with the layout, whereas the other term involves a convolution of the analytical model with an assist feature perturbation. Note that the layout term can require a large amount of computation. Hence, embodiments of the present invention usually pre-compute this term and store it in a database. On the other hand, the assist feature perturbation term can be quickly computed, and hence, this term is typically determined during operation (e.g., run time). In contrast, prior art techniques do not separate the convolution computation into two terms. Hence, prior art techniques usually require a substantially large amount of computation during operation.

CONCLUSION

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art. Additionally, the above disclosure is not intended to limit the present invention. The scope of the present invention is defined by the appended claims.

What is claimed is:

1. A method for determining an assist feature placement, the method comprising:
    receiving an initial assist feature placement for a layout;
    receiving two or more evaluation points in the layout, wherein the evaluation points are locations in the layout where process variations are expected to affect the layout's manufacturability;
    determining assist feature perturbations, wherein each assist feature perturbation includes one or more modifications to assist feature geometries in the initial assist feature placement;
    determining perturbation values at the evaluation points in the layout using the assist feature perturbations and a process-sensitivity model, wherein the perturbation values indicate changes in the layout's sensitivity to process variations at the evaluation points;
    determining changes in an objective function's value using the perturbation values, wherein the objective function's value is indicative of the layout's manufacturability;
    using the changes in the objective function's value to select a first assist feature perturbation;
    determining an assist feature placement by applying the first assist feature perturbation to the initial assist feature placement; and
    placing assist features in the layout according to the assist feature placement, thereby improving the layout's manufacturability.

2. The method of claim 1, wherein determining the assist feature perturbations involves:
    determining a mask rule violation in the initial assist feature placement; and
    determining an assist feature perturbation using the mask rule violation.

3. The method of claim 1, wherein determining the perturbation values at the evaluation points involves:
    receiving a first value which was pre-computed by convolving the process-sensitivity model with the layout at an evaluation point;
    determining a second value by convolving the process-sensitivity model with an assist feature perturbation at the evaluation point; and
    determining perturbation value using the first value and the second value.

4. The method of claim 1, wherein the objective function, Q, is given by $$Q = \sum_i C(M_i[p(x, y)]),$$

wherein p(x, y) is a two dimensional function that represents the layout, i is an evaluation point, $M_i[p(x, y)]$ is the value of the convolution of the process-sensitivity model with the layout at the evaluation point i, and C is a cost function.

5. The method of claim 4, wherein the cost function returns a low value when the cost function's input value falls within a desired range, and returns a high value when the cost function's input value falls outside the desired range.

6. The method of claim 1, wherein the process-sensitivity model is generated by:
    receiving an on-target process model that models semiconductor manufacturing processes under a first set of process conditions;
    receiving an off-target process model that models semiconductor manufacturing processes under a second set of process conditions, which are different from the first set of process conditions; and
    generating the process-sensitivity model using the on-target process model and the off-target process model.

7. A computer-readable storage medium storing instructions that when executed by a computer cause the computer to perform a method for determining an assist feature placement, the method comprising:
    receiving an initial assist feature placement for a layout;
    receiving two or more evaluation points in the layout, wherein the evaluation points are locations in the layout where process variations are expected to affect the layout's manufacturability;
    determining assist feature perturbations, wherein each assist feature perturbation includes one or more modifications to assist feature geometries in the initial assist feature placement;
    determining perturbation values at the evaluation points in the layout using the assist feature perturbations and a process-sensitivity model, wherein the perturbation values indicate changes in the layout's sensitivity to process variations at the evaluation points;

determining changes in an objective function's value using the perturbation values, wherein the objective function's value is indicative of the layout's manufacturability;

using the changes in the objective function's value to select a first assist feature perturbation;

determining an assist feature placement by applying the first assist feature perturbation to the initial assist feature placement; and placing assist features in the layout according to the assist feature placement, thereby improving the layout's manufacturability.

8. The computer-readable storage medium of claim 7, wherein determining the assist feature perturbations involves:

determining a mask rule violation in the initial assist feature placement; and determining an assist feature perturbation using the mask rule violation.

9. The computer-readable storage medium of claim 7, wherein determining the perturbation values at the evaluation points involves:

receiving a first value which was pre-computed by convolving the process-sensitivity model with the layout at an evaluation point;

determining a second value by convolving the process-sensitivity model with an assist feature perturbation at the evaluation point; and determining perturbation value using the first value and the second value.

10. The computer-readable storage medium of claim 7, wherein the objective function, Q, is given by $$Q = \sum_i C(M_i[p(x, y)]),$$

wherein p(x, y) is a two dimensional function that represents the layout, i is an evaluation point, $M_i[p(x, y)]$ is the value of the convolution of the process-sensitivity model with the layout at the evaluation point i, and C is a cost function.

11. The computer-readable storage medium of claim 10, wherein the cost function returns a low value when the cost function's input value falls within a desired range, and returns a high value when the cost function's input value falls outside the desired range.

12. The computer-readable storage medium of claim 10, wherein the process-sensitivity model is generated by:

receiving an on-target process model that models semiconductor manufacturing processes under a first set of process conditions;

receiving an off-target process model that models semiconductor manufacturing processes under a second set of process conditions, which are different from the first set of process conditions; and generating the process-sensitivity model using the on-target process model and the off-target process model.

13. An apparatus for determining an assist feature placement, the apparatus comprising:

a first receiving mechanism configured to receive an initial assist feature placement for a layout;

a second receiving mechanism configured to receive two or more evaluation points in the layout, wherein the evaluation points are locations in the layout where process variations are expected to affect the layout's manufacturability;

a perturbation-determining mechanism configured to determine assist feature perturbations, wherein each assist feature perturbation includes one or more modifications to assist feature geometries in the initial assist feature placement;

a value-determining mechanism configured to determine perturbation values at the evaluation points in the layout using the assist feature perturbations and a process-sensitivity model, wherein the perturbation values indicate changes in the layout's sensitivity to process variations at the evaluation points;

a change-determining mechanism configured to determine changes in an objective function's value using the perturbation values, wherein the objective function's value is indicative of the layout's manufacturability;

a selecting mechanism configured to use the changes in the objective function's value to select a first assist feature perturbation;

a placement-determining mechanism configured to determine an assist feature placement by applying the first assist feature perturbation to the initial assist feature placement; and a placing mechanism configured to place assist features in the layout according to the assist feature placement, thereby improving the layout's manufacturability.

14. The apparatus of claim 13, wherein the perturbation-determining mechanism is configured to:

determine a mask rule violation in the initial assist feature placement; and to determine an assist feature perturbation using the mask rule violation.

15. The apparatus of claim 13, wherein the value-determining mechanism is configured to:

receive a first value which was pre-computed by convolving the process-sensitivity model with the layout at an evaluation point;

determine a second value by convolving the process-sensitivity model with an assist feature perturbation at the evaluation point; and to determine perturbation value using the first value and the second value.

16. The apparatus of claim 13, wherein the objective function, Q, is given by $$Q = \sum_i C(M_i[p(x, y)]),$$

wherein p(x, y) is a two dimensional function that represents the layout, i is an evaluation point, $M_i[p(x, y)]$ is the value of the convolution of the process-sensitivity model with the layout at the evaluation point i, and C is a cost function.

17. The apparatus of claim 16, wherein the cost function returns a low value when the cost function's input value falls within a desired range, and returns a high value when the cost function's input value falls outside the desired range.

18. The apparatus of claim 13, wherein the process-sensitivity model is generated by:

receiving an on-target process model that models semiconductor manufacturing processes under a first set of process conditions;

receiving an off-target process model that models semiconductor manufacturing processes under a second set of process conditions, which are different from the first set of process conditions; and generating the process-sensitivity model using the on-target process model and the off-target process model.

* * * * *